Dec. 11, 1956  V. D. POLHEMUS ET AL  2,773,990
STROBOSCOPIC DISPLAY DEVICES
Filed Oct. 25, 1949  2 Sheets-Sheet 1

Inventors
Von D. Polhemus &
Lothrop M. Forbush
By Willits, Helmig & Baillio
Attorneys Dec. 11, 1956    V. D. POLHEMUS ET AL    2,773,990
STROBOSCOPIC DISPLAY DEVICES Filed Oct. 25, 1949    2 Sheets-Sheet 2

Inventors
Von D. Polhemus &
Lothrop M. Forbush
By Willits, Helwig & Baillio
Attorneys

2,773,990

STROBOSCOPIC DISPLAY DEVICES

Von D. Polhemus, Plymouth, and Lothrop M. Forbush, Ferndale, Mich., assignors to General Motors Corporation, Detroit, Mich., a corporation of Delaware Application October 25, 1949, Serial No. 123,488

1 Claim. (Cl. 250—71)

This invention relates to stroboscopic display devices adapted to produce striking, fascinating and attractive illusions which may be used to good advantage in educational and advertising exhibits, and the like.

One of the objects of this invention is to provide a display device in which the stroboscopic illusion may be produced with respect to selected parts of the exhibit without material reduction in the intensity of the ambient light normally present at the exhibit.

Another object of the invention is to provide a display device in which the selected parts of the exhibit stand out and appear to be entirely detached from the surrounding structure even though such adjacent structure may be moving through the same space at the same frequency as the selected parts and even though the whole exhibit or at least said adjacent structure is subjected to the light rays that produce the stroboscopic effect.

Another object of the invention is to provide a display device which will allow an observer to view the stroboscopic illusion without discomfort, even though he may be looking directly toward one or more of the light sources which flash to produce the illusion.

Another object of the invention is to provide a display device in which the selected parts of the exhibit may be coated with a colored fluorescent material which, when subjected to ultra-violet light rays, causes the coated parts to contrast colorfully with the color of the same parts under the normal ambient light, to enhance the stroboscopic effect and more forcibly draw the attention of the observer to the part being displayed.

According to the invention the selected parts of the exhibit, which are continuously driven or actuated at a desired frequency or speed, are treated with a fluorescent material, for instance by coating the same with a fluorescent paint, and these parts are subjected to light rays which pass through a filter that absorbs all light rays except those that fluoresce the coating material. More specifically a filter is provided at the light source so that only invisible ultra-violet or black light passes through to the selected parts. The filter thereby eliminates the objectionable view of any intermittently flashing powerful light source, and its momentary blinding effect on the observer, which may detract from or destroy the stroboscopic effect. Also the light is flashed at a frequency which may be the same as or greater than or less than the frequency or speed of movement of the selected parts with the result that a stroboscopic illusion is produced in which the selected parts may appear not to move, to move more slowly than their actual frequency or speed, and either forwardly or backwardly depending respectively on whether the frequency is less or greater than the actual frequency or speed of the moving part with respect to which a stroboscopic illusion is to be created.

The illustrative embodiment of the invention shown in the drawings includes a small car chassis model equipped with front and rear wheel suspensions comprising independent coil spring mountings at the front and longitudinal semi-elliptical springs at the rear. These parts, together with the engine cooling fan, are shown as coated with a fluorescent material. The wheels of the car rest upon driven drums provided with protuberances so that upon rotation of the drums the wheels are moved and the spring suspensions therefore actuate in simulation of conditions encountered in actual driving on the road. In the resulting stroboscopic illusion only the fluorescent coated parts are seen and these parts appear to be entirely detached from the surrounding structure and to move slowly in the performance of their respective functions.

While the wheel suspensions and engine cooling fan are the selected parts illustrated in the example shown in the drawings, it is obvious that other moving parts of the car chassis may be featured in the stroboscopic illusion. Also any other device having moving parts may be used as the object of the exhibit and the selected parts provided with a fluorescent coating and actuated.

The various objects and advantages of the invention will be made more apparent from the following description, especially when considered in connection with the accompanying drawings in which:

Figure 1a is a fragmentary elevational view of a portion of one of the moving parts of the exhibit featured in the stroboscopic illusion.

Figure 1:
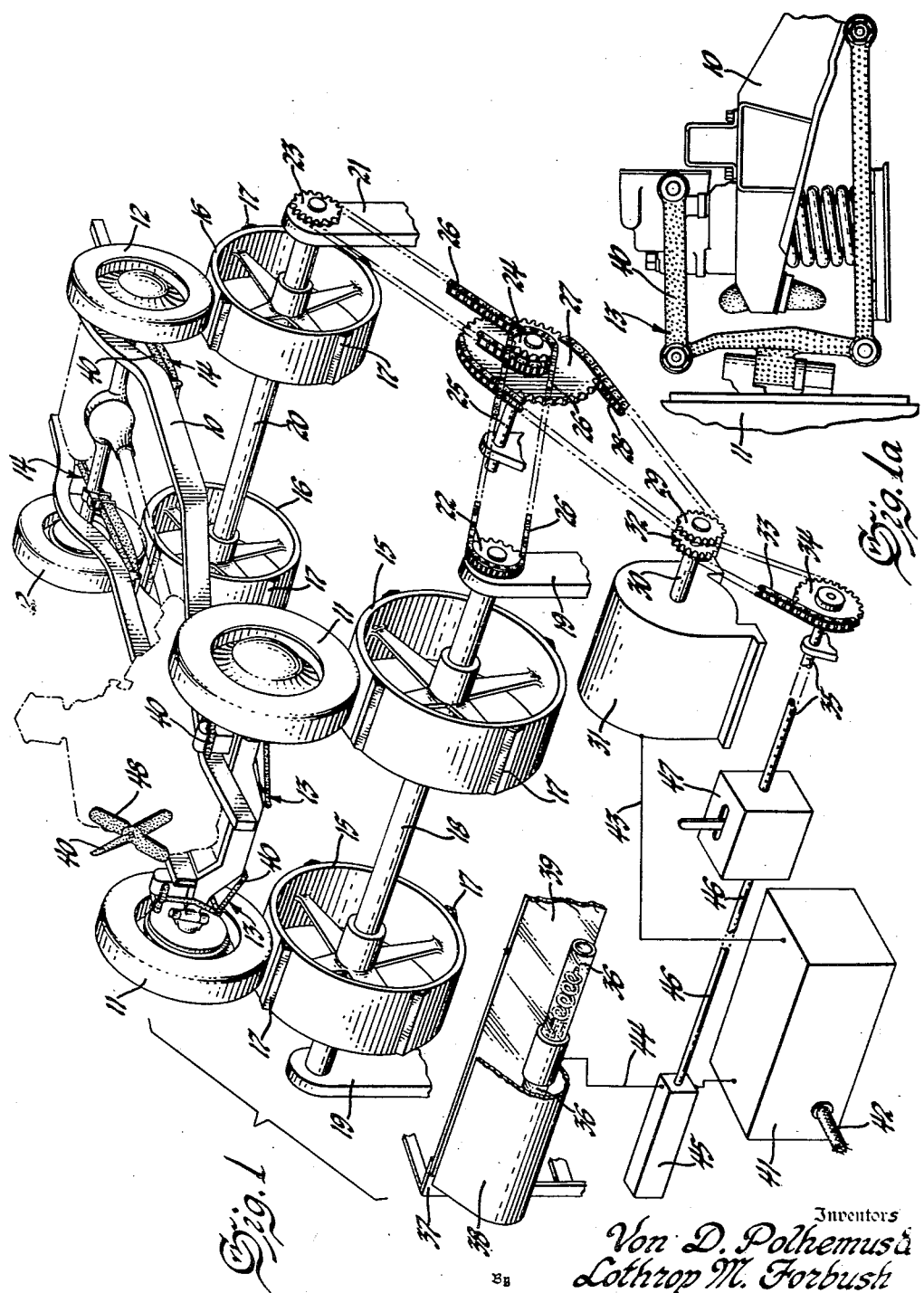
Figure 1 is a separated semi-diagrammatic perspective view of a display device constructed in accordance with this invention.

Referring now to the drawings, the reference character 10 indicates a small car chassis model provided with front wheels 11 and rear wheels 12. The front wheel suspensions consist of independent coil spring mountings 13 and the rear wheel suspensions consist of longitudinal semi-elliptical springs 14.

The front wheels 11 rest upon driven drums 15 and the rear wheels 12 rest upon driven drums 16. The drums 15 and 16 are provided with peripherally spaced radially extending projections or protuberances 17 so that upon rotation of the drums the wheels are moved up and down and the spring suspensions 13 and 14 therefore actuate in simulation of conditions encountered in actual driving on the road.

The drums 15 are fixed to a shaft 18 rotatably mounted in supports 19 and the drums 16 are fixed to a shaft 20 rotatably mounted in supports 21.

Sprocket wheels 22 and 23 are fixed respectively to shafts 18 and 20 and are connected to companion sprocket wheels 24 fixed to an idler shaft 25 by sprocket chains 26. A main sprocket wheel 27 is also fixed to idler shaft 25 and is connected by sprocket chain 28 to a sprocket wheel 29 fixed to the shaft 30 of the driving motor 31. Also fixed to the shaft 30 is another sprocket wheel 32 connected by a sprocket chain 33 to a sprocket wheel 34 fixed to a shaft 35.

The source of electric light is here shown as comprising two tubular electric lights 36 supported in a frame 37. The lights are provided with a reflector 38 for directing the light rays toward the parts of the exhibit to be featured in the stroboscopic illusion. Associated with the light source is a filter 39 which filters the light rays so that only invisible ultraviolet or black light is directed to the selected parts.

In the example illustrated in Figures 1 and 1a, the parts selected particularly to be featured in the stroboscopic illusion are the front wheel suspensions 13 and the rear wheel suspensions 14. These parts, as illustrated, are treated with a fluorescent material 40, for instance, by coating the same with a fluorescent paint. By treating the selected parts with fluorescent material, the stroboscopic illusion may be produced with respect to these parts of the exhibit without material reduction in the intensity of the ambient light normally present at the exhibit. The fluorescent material 40 may be such that when fluoresced the coated parts contrast colorfully with the color of these same parts under the normal ambient light.

The reference character 41 indicates a power pack or supply connected to a source of current by an electric cable 42. The power pack 41 is connected to the motor 31 by wiring 43 and to the source of light by wiring 44. Interposed in the connection between the power pack and lights is a switch device 45 for flashing the light at the desired frequency. The switch device 45 is actuated by a shaft 46 connected to a frequency control device 47. The frequency control device is connected to the shaft 35 to be actuated thereby.

In operating the display device the drums 15 and 16 are driven by the motor 31 through the previously described sprocket wheel and chain connections and the wheels 11 and 12 of the model are forced to rotate by friction contact with the drums, it being understood that the car chassis is held from movement relative to said drums. Upon rotation of the drums the protuberances carried thereon engage the wheels to cause these wheels to move up and down whereupon the spring suspensions 13 and 14 therefore actuate in simulation of conditions encountered in actual driving on the road. At the same time through gearings 32, 33 and 34, shaft 35, frequently control 47 and shaft 46, the switch device 45 is actuated to flash the lights 36 within a range of frequencies so related to the speed of movement of the selected parts 13 and 14 that a stroboscopic illusion is produced in which the selected parts appear to move slowly at a fraction of their actual frequency or speed. During this stroboscopic illusion only the fluorescent coated parts are seen and these parts appear to be entirely detached from the surrounding structure and to move slowly in the performance of their respective functions.

Inasmuch as only invisible ultraviolet or black light passes through the filter to the selected parts, only the selected parts are visible in the stroboscopic illusion. In other words the filters absorb all the light rays except those that fluoresce the coating material of the selected parts. Thus the selected parts stand out and appear to be entirely detached from the surrounding structure even though such adjacent structure may be moving through the same space at the same frequency as the selected parts and even though the whole exhibit or at least the said adjacent structure is subjected to the light rays that produce the stroboscopic effect.

If the fan 48 is to be featured in the stroboscopic illusion, this fan would also be coated with a fluorescent material and driven by a suitable connection (not shown) with the driving gearing already described or by any other suitable or desired means.

Figure 2:
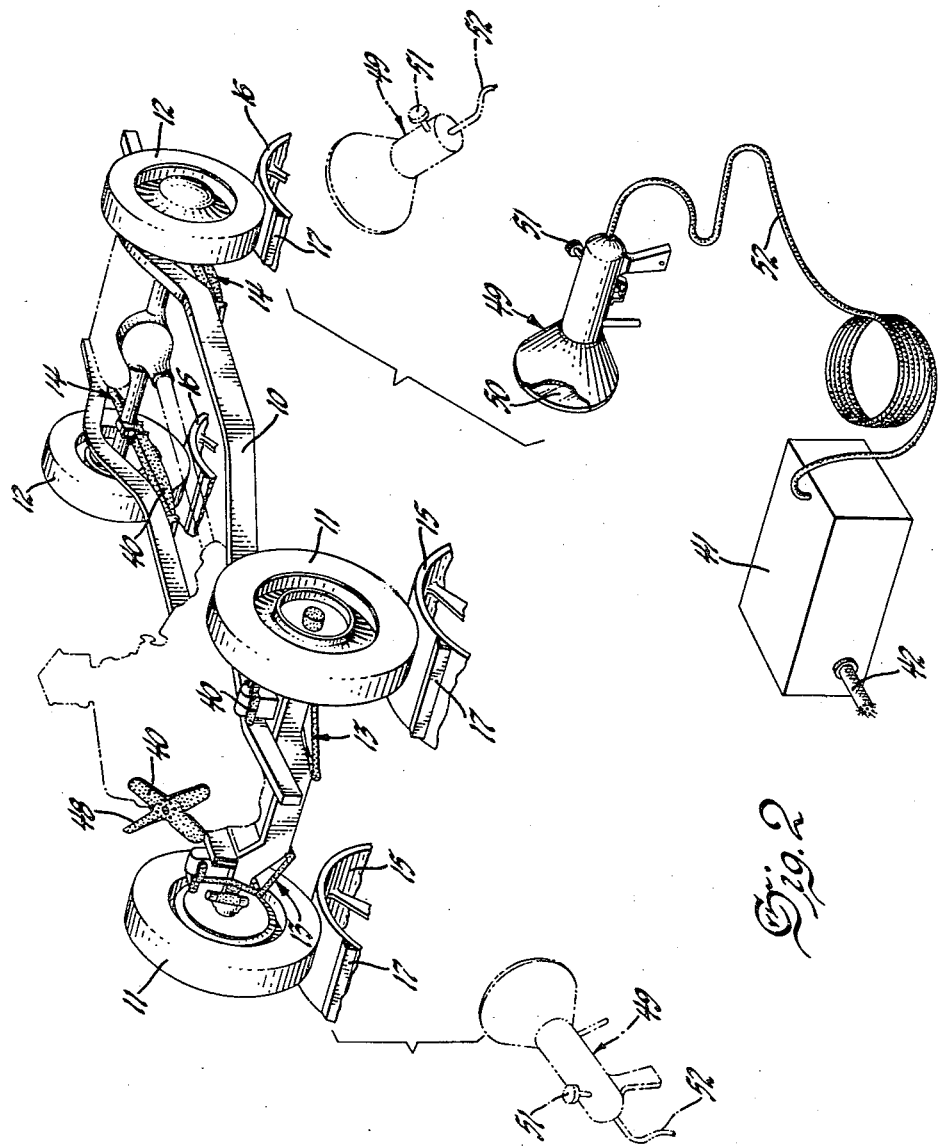
Figure 2 is a view similar to Figure 1 of a slightly modified arrangement.

In Figure 2 a slightly modified arrangement is illustrated in which the light source is mobile instead of fixed. In this illustration the reference character 49 indicates the mobile light source provided with a filter 50 similar to the filter 39. The frequency of the flashing of the light may be regulated by a frequency changer controlled by a control member 51. In this illustration the light source 49 is shown connected to power pack 41 by electric conduit 52.

With this arrangement the source of light may be moved to various positions with respect to the exhibit so that the light rays can be directed toward any of the fluorescent coated parts of the exhibit to be featured in the stroboscopic illusion.

It is obvious that with the described invention any type of device having moving parts may have these parts featured in the stroboscopic illusion provided these parts are coated with a fluorescent coating and are actuated at a frequency or speed slightly in excess of the frequency at which the light is flashed.

Having thus described the invention, what is claimed is:

A display device comprising an apparatus having a unitary and movable part which is distinguishable in outline and configuration from other unitary and relatively movable parts of said apparatus, fluorescent coating means on said part and covering the outline of said part when viewed from a remote point of observation, means for moving said part throughout an area greater than said outline and at a rate great enough to obscure observation of said outline from said point, ultraviolet light projecting means adapted to be located at said point of observation and to project ultraviolet light on said outline when said part is moving in said greater area, means for intermittently projecting said ultraviolet light from said means and upon said part as said part moves within said area and at a rate equal to a multiple of the rate of motion of said part within said area for indicating the outline of said part from said point of observation, and means for changing the rate of projection of said ultraviolet light to a different rate, said different rate being near enough to said equal multiple rate to indicate the outline of said part in motion at an apparent rate differing from the rate of motion of said part and rate of projection of said light and within a range in which the motion of said outline at said apparent rate will be discernible to an observer as a slow and continuous movement of said part within said greater area.

References Cited in the file of this patent

UNITED STATES PATENTS

| | | |
|---|---|---|
| 1,717,785 | Kaehni et al. | June 18, 1929 |
| 2,445,304 | Grace | July 13, 1948 |
| 2,467,661 | De Ment | Apr. 19, 1949 |
| 2,525,914 | Knauth | Oct. 17, 1950 |